No. 736,899. Patented August 18, 1903.

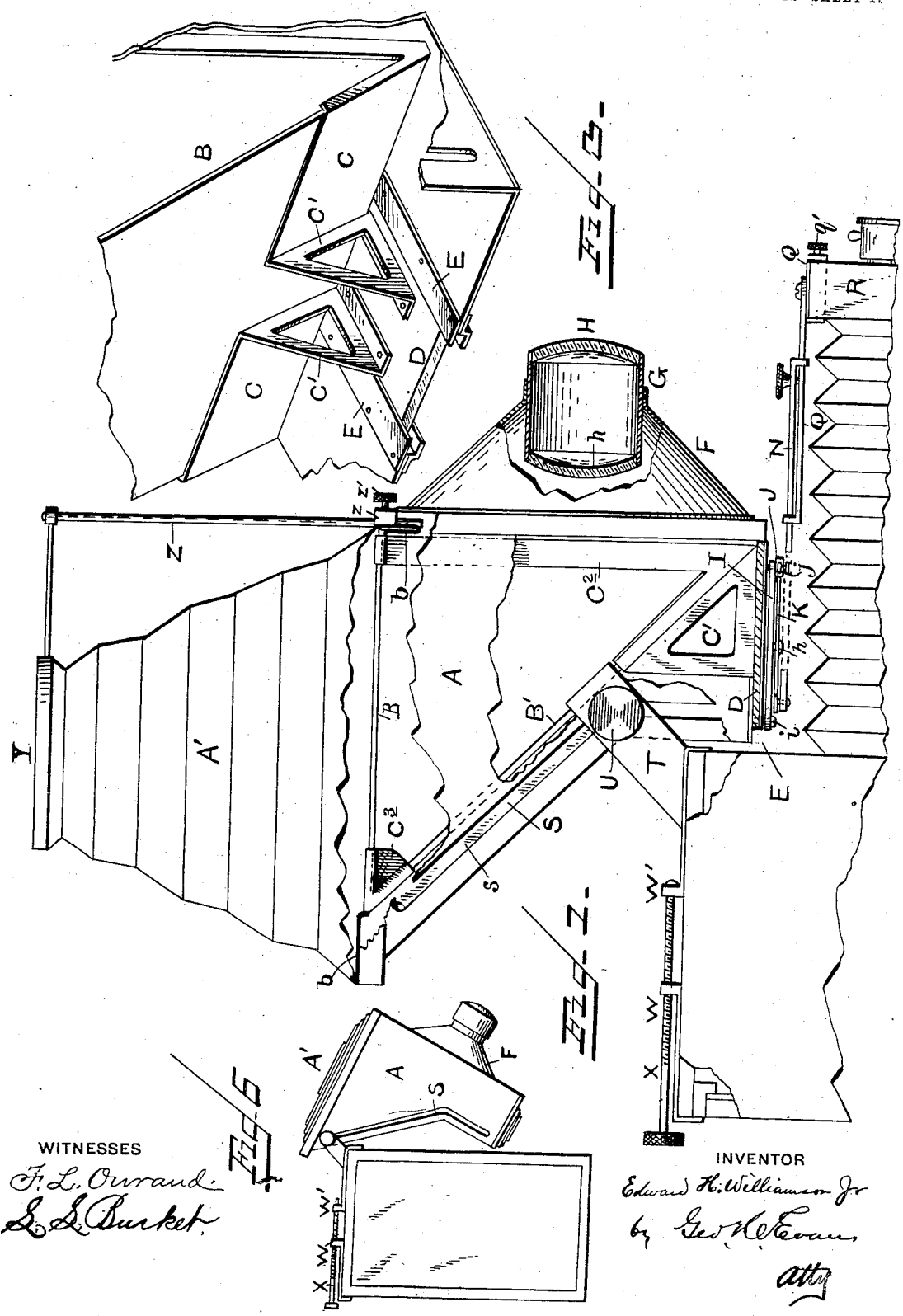

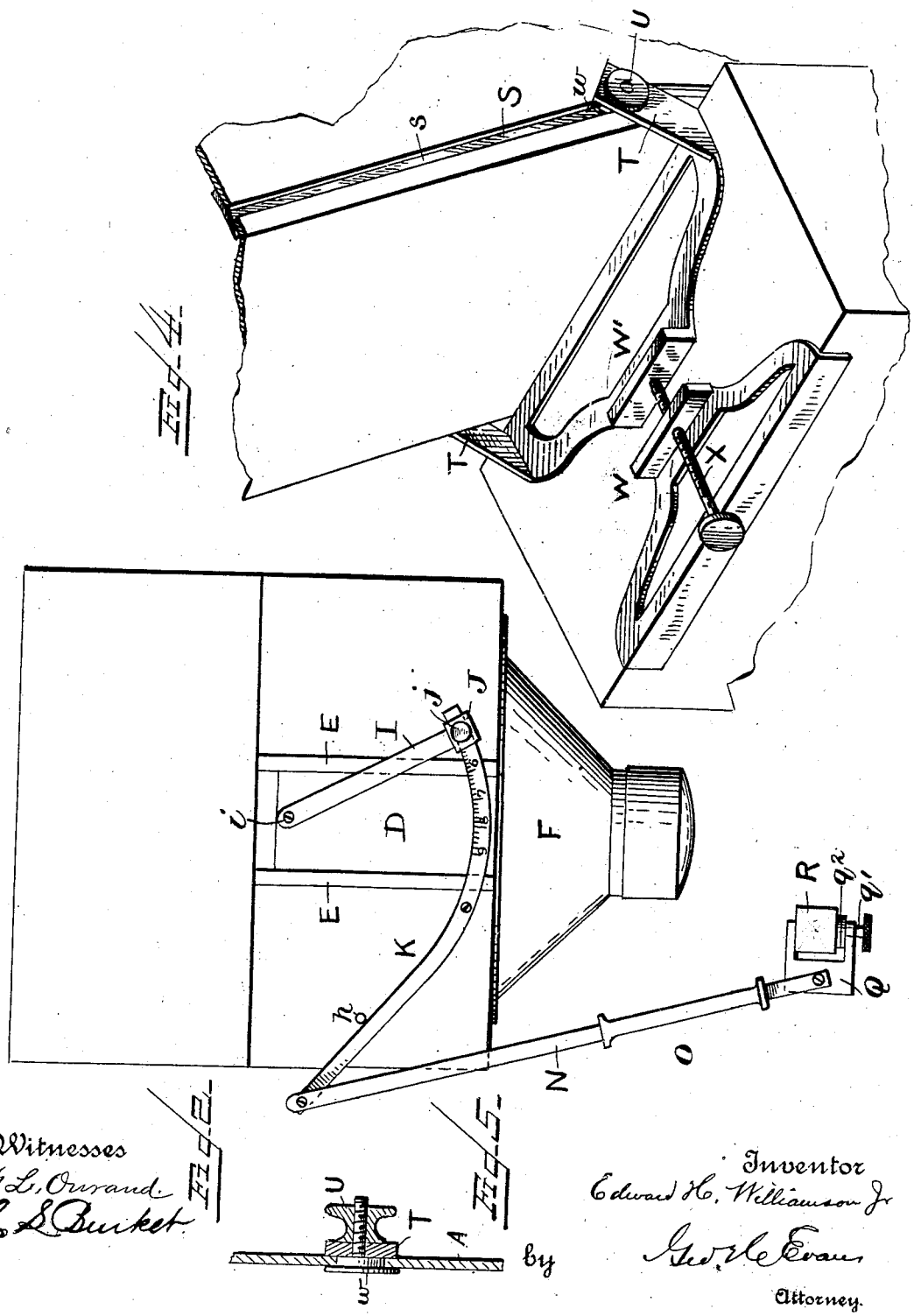

UNITED STATES PATENT OFFICE.

EDWARD H. WILLIAMSON, JR., OF PHILADELPHIA, PENNSYLVANIA, ASSIGNOR OF ONE-HALF TO FRANK W. SHRIVER, OF PHILADELPHIA, PENNSYLVANIA.

FOCUSING VIEW-FINDER FOR PHOTOGRAPHIC CAMERAS.

SPECIFICATION forming part of Letters Patent No. 736,899, dated August 18, 1903.

Application filed June 11, 1903. Serial No. 161,082. (No model.)

*To all whom it may concern:*

Be it known that I, EDWARD HAND WILLIAMSON, Jr., of Philadelphia, in the county of Philadelphia, State of Pennsylvania, have invented certain new and useful Improvements in Focusing View-Finders for Photographic Cameras, of which the following is a specification.

This invention relates to that class of view-finders in which it is possible to obtain simultaneously focused images of the same object in both finder and camera.

The objects of my invention are to provide such a finder with a focusing-screen and reflecting-mirror, which are simultaneously adjustable with regard to a fixed finder-lens; to provide a novel device by which it is possible to automatically regulate the adjustment of the focusing-screen and mirror with regard to the finder-lens and camera-lens, so that the one finder may be applied to cameras of different sizes, having lenses of different focal lengths, and still obtain correctly-focused images of the same object simultaneously in both finder and camera; to provide a novel device whereby the finder may be clamped to any camera without interfering with the opening, closing, or adjustment of said camera, and to provide a novel device by which the position of the finder in regard to the above-mentioned clamp may be altered to suit the convenience of the operator, both for adjusting the height of the finder and in arranging it compactly for transportation. These objects I accomplish by the construction shown in the accompanying drawings, in which—

Figure 1 is a side elevation of the improved finder mounted on a camera, the case being cut partly away to show clearly the interior mechanism. Fig. 2 is a view of the bottom of the finder-box, showing in detail the mechanism by which the focusing-screen and mirror of the finder are moved and adjusted. Fig. 3 shows in perspective an interior view of the moving mechanism of screen and mirror, the back and sides of the finder-box being cut away. Fig. 4 shows in perspective the details of the adjustable clamp by which the finder is attached to the camera. Fig. 5 shows a detail of the small clamp by which the finder-box is attached to the camera-box clamp. Fig. 6 shows the finder folded compactly against the camera for convenience in transportation.

A designates the box or case of the finder, which may be of any suitable size, material, and shape. Within parallel guides E E in the bottom of the box is mounted a horizontal slide D, upon which is secured the rearwardly-inclined supports C C, which support the mirror B' at an angle of forty-five degrees to the front of the box, these supports being provided with braces or legs C at their adjacent edges which connect them to the said slide D. From the side edges of the supports C C at their lower forward portions project the standards $C^2$, which at their upper ends support the forward corners of the horizontal screen or ground-glass plate B. The rear corners of this screen or plate B are connected to the upper corners of the mirror B' by corner-pieces or clamps $C^3$, so that the plate B and the mirror B' will be held firmly together and to the supports C C. The spaces between the box A and the front and rear edges of the screen or plate B are closed by means of opaque flexible material $b$, so that no light may pass into the box.

F is a conical tube on the front of the box and provided with a central aperture in which is fixed the tube G of the finder-lens H $h$, which may be either single, double, or combination.

On top of the box is arranged a vertically-extensible tubular hood A', of flexible opaque material, adapted to fold bellows-like when not in use. This hood is secured at its lower edge to the top of the box A and is secured at its top to a horizontal frame Y, supported at the upper end on one or more vertically-adjustable rods Z, sliding vertically in sockets or guideways $z$ in the front of the box and clamped at any desired height by the set-screw $z'$. When the hood is not in use, these rods Z are slid down into the box A, where they are out of the way.

The box A is provided with a clamp by which it may be secured to a camera, and this clamp is formed of two members W W', each having a jaw to engage the camera and connected by a screw X, which moves the two clamp members together or apart. (See Figs. 1 and 4.) The sides of the box are provided in rear of the mirror with slots S, the lower ends of which are vertical and the upper portions of which are inclined rearwardly and upwardly. The forward clamp member W' is provided with upwardly and forwardly projecting ears or arms T, through which and the slots S project the set-screws $w$, the heads of the screws lying within the box. On the outer ends of the screws $w$ are placed the nuts U, so that by turning these nuts the slotted sides of the box A may be clamped between the heads of the screws $w$ and the arms T. The height of the box may therefore be adjusted by means of the vertical portions of the slots S and the screws and nuts $w$ U, while by means of the inclined portions of the slots the box may be allowed to swing down alongside the camera, as shown in Fig. 6, where it will be out of the way.

I will now describe the mechanism for effecting the simultaneous and relative adjustment of the finder-mirror and screen to the camera-lens. K designates a horizontal lever pivoted between its ends to the bottom of the box A and having a curved graduated end crossing the forward end of slide D, to the rear end of which slide said lever is connected by a link I, pivoted as at $i$. The connection between the forward end of the link I and the graduated end of lever K is effected by means of a slide J, pivotally secured to the link and provided with a set-screw $j$, engaging the lever K, so as to hold the slide to its adjusted position thereon. The rearward movement of the long arm of lever K is limited by a stop $h$, and to the end of said long arm is pivoted the rear end of an extensible rod or bar N O, provided at the forward end of its member O with a pivoted clamp Q, adapted to embrace the lens-post R of the camera and be clamped thereto by a set-screw $q'$, faced with leather $q^2$, so as not to mar the lens-post.

The operation is as follows: The finder is secured to the camera by the clamp W W', the camera-bellows and its lens are moved out, as in Fig. 1, to the hundred-foot mark, and the lever K of the finder is moved back till it strikes the stop $h$. The rod N O will now be extended sufficiently to allow clamp Q to be secured to the lens-post R. The clamp J will now be moved along the graduated arm of lever K until it reaches a number corresponding to the focal length of the camera-lens—for instance, it would be moved to 6 for a six-inch lens, and so on. Thus the finder may be applied to cameras having different focal lengths, and, when once adjusted as just described, whenever an object is properly focused in the finder it will also be properly focused in the camera.

The relatively greater travel of the straight arm of lever K is compensated for by the reduction of the length of the leverage between pivot L and clamp J.

I may state that the rear side of the box A conforms to the shape of the slot S, so that its vertical portion will lie in front of the camera-case, while its inclined portion will overhang same.

It is obvious that the mirror alone may be moved toward and from the finder-lens, if desired, or that the ground glass alone may be the movable part. For convenience, therefore, I will term the movable member of the finder a "focusing" device, movable relatively to the fixed finder-lens.

The slots S are provided at the inner sides of the box with light-excluding flaps or strips $s$.

What I claim is—

1. A view-finder comprising, a casing provided with means for detachably securing it to a camera, a finder-lens and screen relatively movable one to the other, a lever pivoted to the casing and adjustably connected to the movable member of the finder to vary the throw for different camera-lenses, and a rod or bar pivoted at one end to said lever and provided at its opposite end with means for securing it to the movable lens-carrier of a camera.

2. A view-finder comprising a box or casing having a fixed lens, a focusing device mounted in the box or casing, and movable relatively to the lens, a lever pivoted to the box or casing and connected to the said focusing device, a rod or bar for connecting said lever to the lens-carrier of a camera and an attaching means for securing the finder to a camera.

3. A view-finder comprising, a box or casing having a fixed lens in its front, a mirror and screen slidingly mounted in the box or casing for movement toward and from the lens, and operating devices for connecting said mirror and screen to the lens-carrier of the camera.

4. A view-finder comprising, a box or casing having a fixed lens in its front, a slide in its bottom, a support on the slide a mirror and screen carried by said support, and an operating mechanism for the slide adapted to connect it to the lens-carrier of a camera.

5. A view-finder for cameras comprising a casing or box, a finder-lens and screen relatively movable one toward the other, a pivoted lever adjustably linked to the movable member of the finder, and an extensible arm connected at one end to the said lever and provided at its opposite end with means for securing it to the movable lens-carrier of a camera.

6. A view-finder for cameras comprising, a box or casing, a finder-lens and mirror and screen relatively movable toward and from each other, a lever pivoted between its ends, a link pivoted to the movable member of the finder and having an adjustable pivotal connection with the said lever and an extensible arm pivoted to the lever and having means at its forward end for connecting it to the movable lens-carrier of a camera.

7. A view-finder for cameras comprising, a box or casing, a finder-lens and screen device relatively movable one to the other, a lever pivoted between its ends and having a curved graduated arm adjustably linked to the movable member of the finder, and an extensible rod connected to the long arm of the lever and having means at its forward end for connecting it with the lens-carrier of a camera.

8. A view-finder for cameras comprising, a box or casing, a finder-lens fixed at the front thereof, a slide in the bottom, a mirror and screen mounted on the slide and visible through the top of the box, a lever pivoted on the bottom of the box and having a graduated curved arm, a link pivoted at one end to the said slide and at its opposite end in pivotal adjustable connection with said curved arm and an extensible rod pivoted to the other arm of the lever and provided at its front end with a clamp or securing device to connect it with the movable lens-carrier of a camera.

9. The combination with a view-finder for cameras, of a clamp for securing the same to a camera, and an adjustable pivotal connection between the finder and its clamp to permit the finder to be moved down along the front of the camera when latter is closed.

10. The combination with a view-finder having vertical and rearwardly-extending slots or guideways in its sides, of a support for the finder provided with arms screws passing through the slots and arms and nuts on the screws.

11. The combination with a view-finder, of a clamp comprising two members or jaws to grasp the ends of a camera and provided with a connecting adjusting-screw, and arms on one clamp member to which the finder is connected.

12. The combination with a view-finder having vertical and rearwardly-extending slots, of a clamp comprising two adjustably-connected members or jaws to grasp the top of a camera, arms projecting from the forward member, screws extending through said slots and arms and provided with nuts.

13. The combination with the view-finder having an extensible hood secured around its sight-opening, of vertically-sliding rod on the finder case or box having a frame at its upper end to which the upper end of the hood is connected and means for securing the rod in its adjusted position.

14. The combination with a view-finder having an extensible hood around its sight-opening, an adjustable rod sliding in an opening provided therefor in the finder-case and a frame on the upper end of the rod to which the upper end of the hood is connected.

15. The combination with the open top casing or box having a lens in its front and a slide in its bottom, of an inclined support mounted on the slide having uprights at its front, and inclined mirror on the support, a horizontal screen extending from the uprights to the upper end of the mirror and secured thereto, flexible connections between the ends of the box or case and the ends of the screen and means for operating the slide.

In testimony whereof I affix my signature in presence of two witnesses.

EDWARD H. WILLIAMSON, JR.

Witnesses:
   JOS. C. MOORE,
   M. J. LOXLEY.